United States Patent [19]
Azar

[11] Patent Number: 5,224,661
[45] Date of Patent: Jul. 6, 1993

[54] LAWN MOWER PULL CORD WINDING APPARATUS

[76] Inventor: Jerry Azar, 4001 Beardsley Dr., Montgomery, Ala. 36109

[21] Appl. No.: 811,847

[22] Filed: Dec. 23, 1991

[51] Int. Cl.$^5$ ............................................. B65H 75/00
[52] U.S. Cl. .................................. 242/54 R; 242/106; 242/96
[58] Field of Search ............... 242/96, 54 R, 179, 199, 242/106; 81/436, 460, 176.1, 176.15, 177.1, 177.3, 488, 484, 486, 177.5; 269/1; 29/240, 240.5, 259, 263

[56] References Cited

U.S. PATENT DOCUMENTS

| | | | |
|---|---|---|---|
| 2,479,796 | 8/1949 | Warzynski | 81/488 X |
| 3,689,978 | 9/1972 | Kelso | 29/259 |
| 4,059,033 | 11/1977 | Johnson | 81/176.1 X |
| 4,083,258 | 4/1978 | Hammett | 29/259 X |
| 4,091,850 | 5/1978 | Kjolsrud | 29/240 |
| 4,147,314 | 4/1979 | Traulsen | 242/179 |
| 4,231,454 | 11/1980 | Bickford et al. | 29/240 |
| 4,807,347 | 2/1989 | Johnson | 242/96 X |
| 4,951,374 | 8/1990 | Barry | 29/240 |
| 4,993,658 | 2/1991 | Lantrip et al. | 242/96 X |
| 5,090,276 | 2/1992 | Groskey | 81/436 |

Primary Examiner—John M. Jillions
Attorney, Agent, or Firm—Hugh E. Smith

[57] ABSTRACT

An elongate shank mounting a handle fixedly and orthogonally to an upper terminal end thereof includes a plurality of lobes arranged relative to one another and in concentric relationship. The lobes are arranged for positioning within a recoil sprocket of an associated lawn mower in the rewinding and repair of such pull cord arrangements. A modification of the invention includes a sharpening tool mounted to the handle as required and further includes a central yoke formed with positioning legs to properly orient the tool structure in use, with the yoke including a ratcheting structure to prevent inadvertent rewind of the recoil pulley of the lawn mower during the winding procedure. The tool and associated lobes are further arranged for reception within the rewind pulley of an associated recoil starter of a conventional lawn mower. The pulley includes a splined socket to receive the tool lobes permitting rewinding of the rope relative to the spring structure to permit ease of winding the pulley to orient the pulley and the recoil rope in an operative relationship.

2 Claims, 5 Drawing Sheets

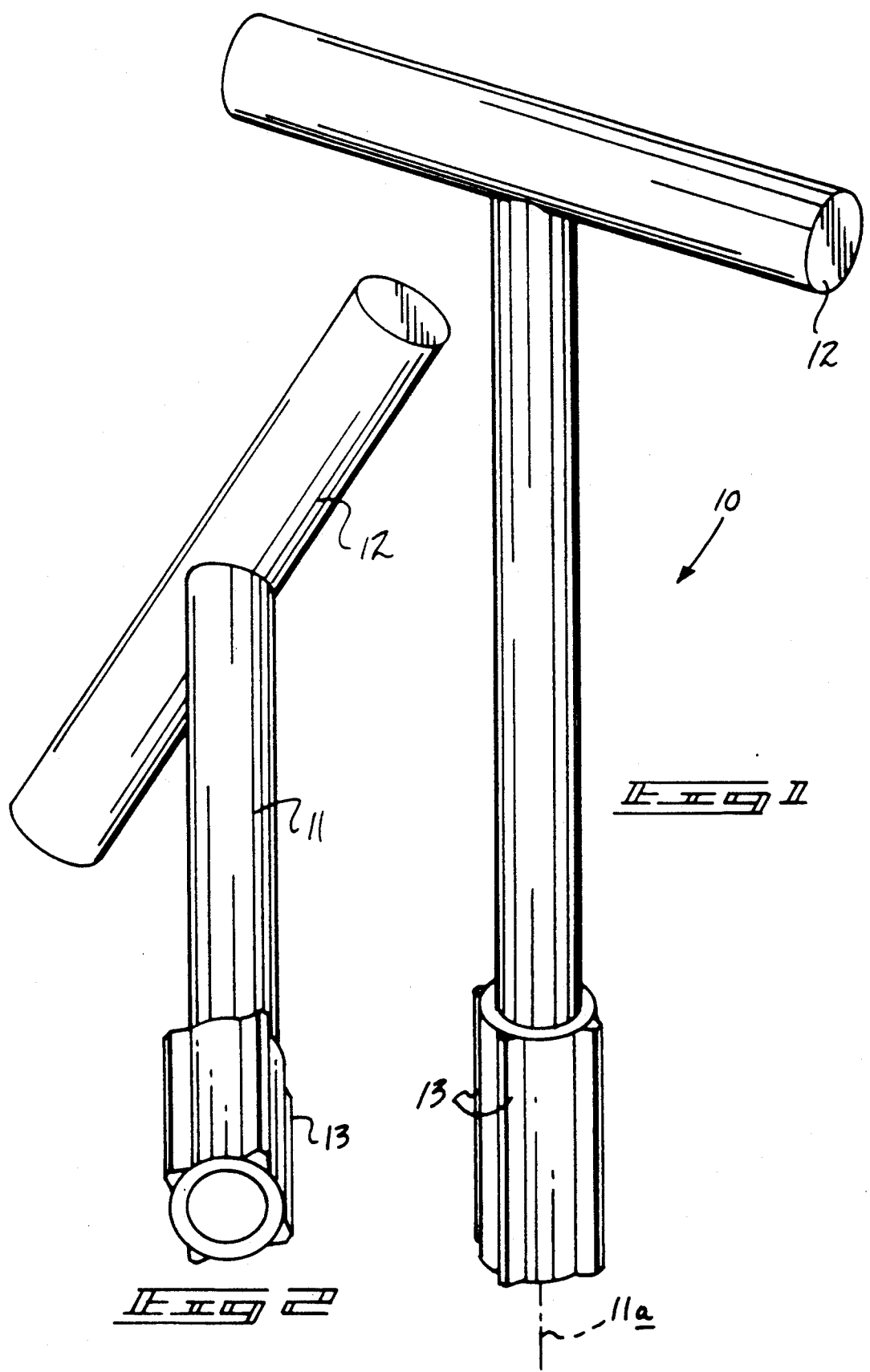

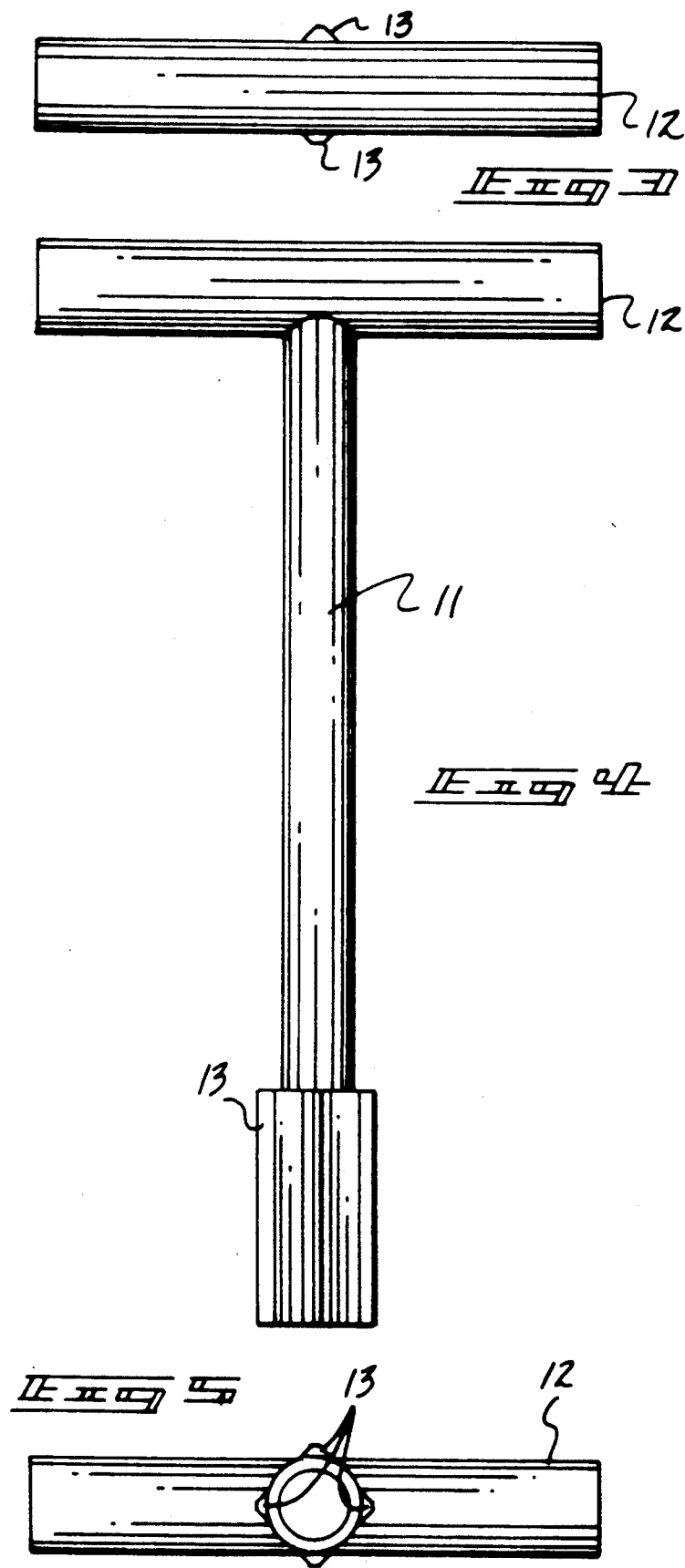

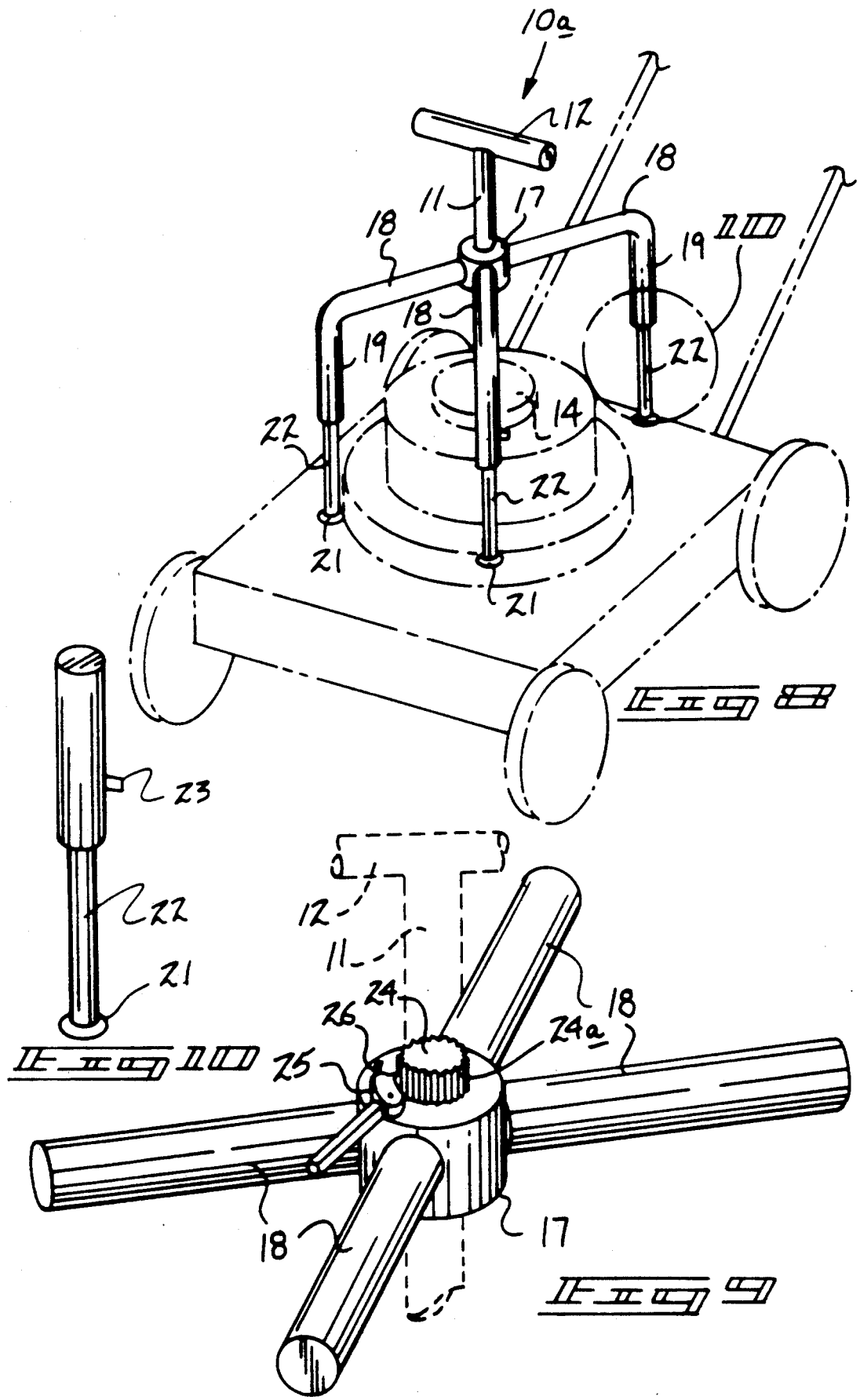

LAWN MOWER PULL CORD WINDING APPARATUS

BACKGROUND OF THE INVENTION

1. Field of the Invention

The field of invention relates to lawn mower apparatus, and more particularly pertains to a new and improved lawn mower pull cord winding apparatus wherein the same is arranged for the winding of a pull sprocket in the repair and maintenance thereof.

2. Description of the Prior Art

Pull cord structure of various types have been utilized in various environments throughout the prior art. The winding and reeling of such structure requires various specialized apparatus and have attained such status in the prior art. For example, U.S. Pat. No. 4,779,816 to Varlet sets forth a cord winder to reduce cord length formed as a plate member, with slots to receive a rope wound thereabout.

U.S. Pat. No. 4,779,817 to Bjork sets forth a further example of a hand winder to wind a cable thereabout.

Accordingly, it may be appreciated that there continues to be a need for a new and improved lawn mower pull cord winding apparatus as set forth by the instant invention which addresses both the problems of ease of use as well as effectiveness in construction in addressing the winding of a lawn mower recoil start pulley in a matter not attended by the prior art and in this respect, the present invention substantially fulfills this need.

SUMMARY OF THE INVENTION

In view of the foregoing disadvantages inherent in the known types of lawn mower apparatus now present in the prior art, the present invention provides a lawn mower pull cord winding apparatus wherein the same is arranged to effect the selective rotation of a lawn mower sprocket to effect its winding relative to a pull cord start mechanism. As such, the general purpose of the present invention, which will be described subsequently in greater detail, is to provide a new and improved lawn mower pull cord winding apparatus which has all the advantages of the prior art lawn mower apparatus and none of the disadvantages.

To attain this, the present invention provides an elongate shank mounting a handle fixedly and orthogonally to an upper terminal end thereof including a plurality of lobes arranged relative to one another and in concentric relationship. The lobes are arranged for positioning within a recoil sprocket of an associated lawn mower in the rewinding and repair of such pull cord arrangements. A modification of the invention includes a sharpening tool mounted to the handle as required and further includes a central yoke formed with positioning legs to properly orient the tool structure in use, with the yoke including a ratcheting structure to prevent inadvertent rewind of the recoil pulley of the lawn mower during the winding procedure. The tool and associated lobes are further arranged for reception within the rewind pulley of an associated recoil starter of a conventional lawn mower. The pulley includes a splined socket to receive the tool lobes permitting rewinding of the rope relative to the spring structure to permit ease of winding the pulley to orient the pulley and the recoil rope in an operative relationship.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn mower pull cord winding apparatus which has all the advantages of the prior art lawn mower apparatus and none of the disadvantages.

It is another object of the present invention to provide a new and improved lawn mower pull cord winding apparatus which may be easily and efficiently manufactured and marketed.

It is a further object of the present invention to provide a new and improved lawn mower pull cord winding apparatus which is of a durable and reliable construction.

An even further object of the present invention is to provide a new and improved lawn mower pull cord winding apparatus which is susceptible of a low cost of manufacture with regard to both materials and labor, and which accordingly is then susceptible of low prices of sale to the consuming public, thereby making such lawn mower pull cord winding apparatus economically available to the buying public.

Still yet another object of the present invention is to provide a new and improved lawn mower pull cord winding apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a further isometric illustration of the invention illustrating the lobe structure mounted to the shank of the invention.

FIG. 3 is an orthographic top view of the instant invention.

FIG. 4 is an orthographic side view of the instant invention.

FIG. 5 is an orthographic bottom view of the instant invention.

FIG. 8 is an isometric illustration of a modification of the invention.

FIG. 9 is an enlarged isometric illustration of the yoke structure utilized by the invention, as set forth in FIG. 8.

FIG. 10 is an isometric illustration of section 10 as set forth in FIG. 8.

DESCRIPTION OF THE PREFERRED EMBODIMENT

Figure 6:
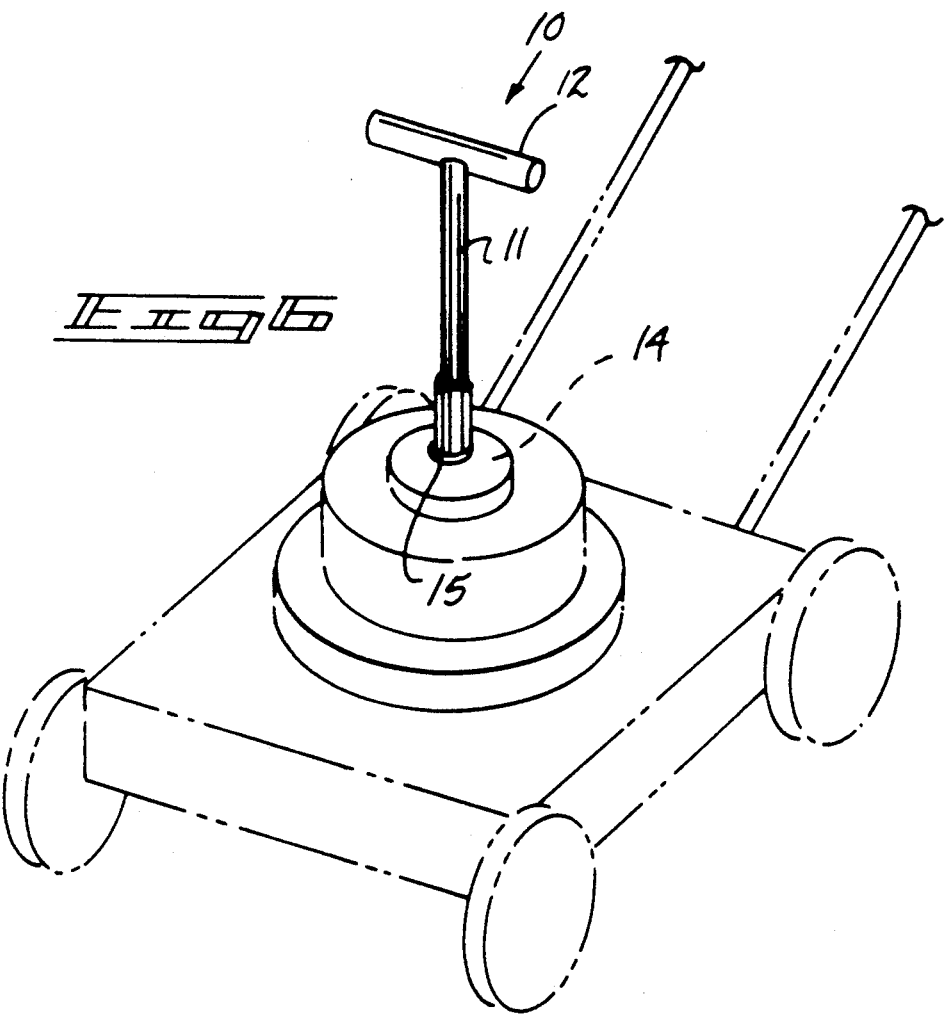
FIG. 6 is an isometric illustration of the instant invention in use.

With reference now to the drawings, and in particular to FIGS. 1 to 10 thereof, a new and improved lawn mower pull cord winding apparatus embodying the principles and concepts of the present invention and generally designated by the reference numerals 10 and 10a will be described.

More specifically, the lawn mower pull cord winding apparatus 10 of the instant invention essentially comprises an elongate coaxially aligned shank 11 defined along a predetermined axis 11a. The shank 11 medially and orthogonally intersects a handle 12 at an upper distal end of the shank 11. A lower distal end of the shank 11 includes a plurality of lobes 13 projecting radially and exteriorly of the shank 11 concentrically mounted about the shank 11 extending upwardly from the lower distal end thereof a predetermined length and arranged parallel and concentrically relative to one another equally spaced about the shank 11. A pull cord pulley 14, as illustrated in FIG. 6 in phantom, includes a central opening or socket 15 to receive the lobes 13 therewithin to permit rotation of the pulley as the socket, as known in the prior art, is formed with internal splines to receive the lobes. In use of the tool 10, an individual removes the recoil housing 30 relative to the lawn mower that includes the recoil rope 31. The pulley 14 includes a splined socket 32 arranged to receive the lobes in a complementary relationship, whereupon inverting of the recoil housing 30 permits insertion of the tool 10 into the socket, whereupon rotation of the pulley is effected by rotation of the shank by means of the handle 12 when the lobes 13 are received within the socket 32. In this manner, manipulation of the pulley and its associated recoil spring to effect assembly and repair of the recoil starter organization is effected.

Figure 7:
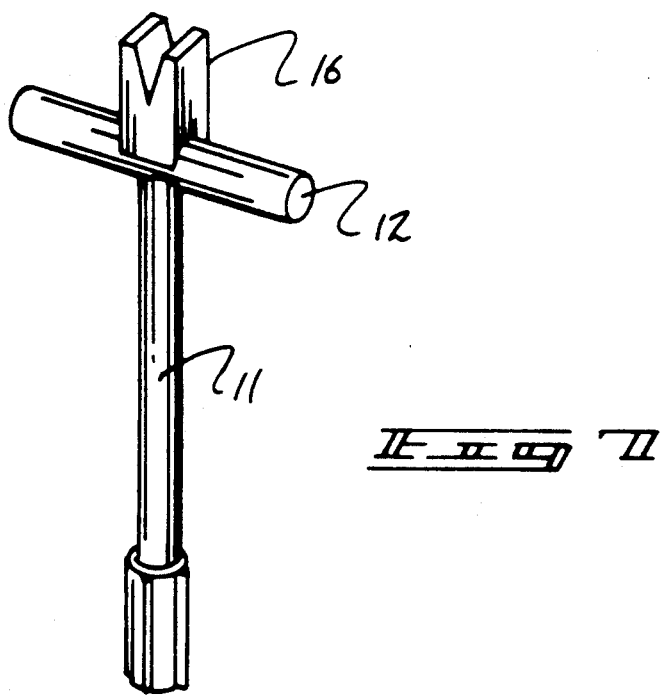
FIG. 7 is an isometric illustration of the invention utilizing a sharpening tool mounted thereto.
Figure 6A:
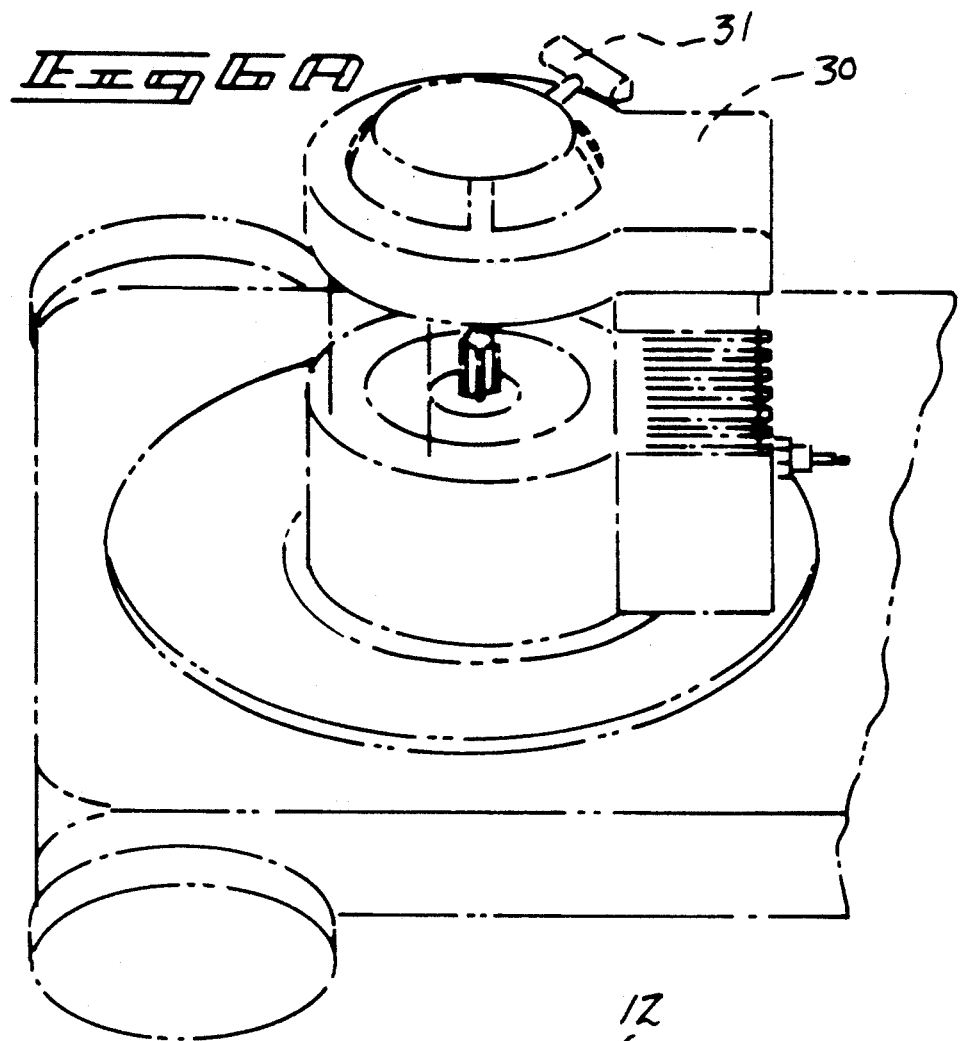
FIG. 6a is an isometric illustration of the lawn mower recoil housing separated from the associated lawn mower.
Figure 6B:
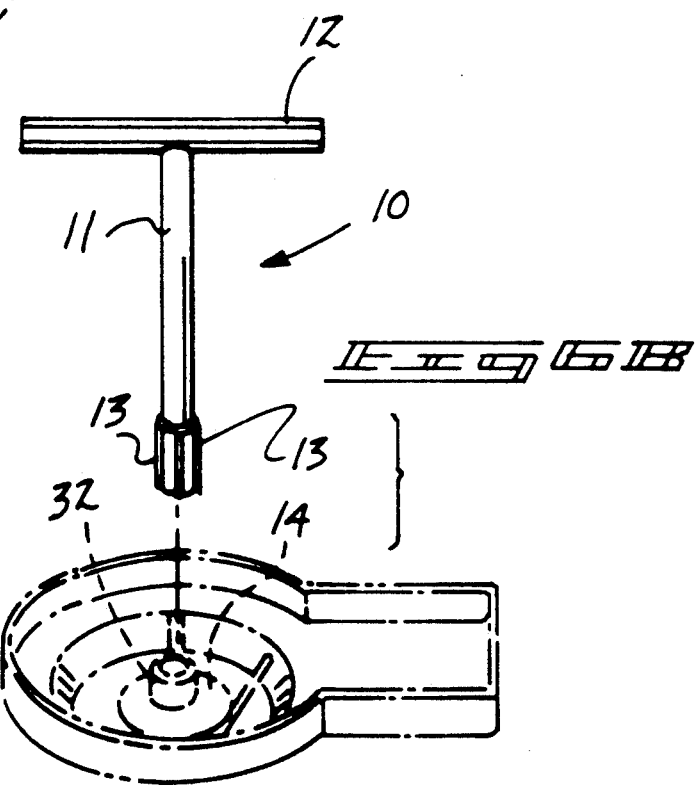
FIG. 6b is an isometric illustration of the tool inserted within the lawn mower recoil housing.

FIG. 7 illustrates the organization utilizing a blade sharpener "V" shaped block 16 permitting sharpening of lawn mower blade edges during use of the multi-purpose tool, as presented by the instant invention.

The FIGS. 8-10 of the invention include a modified aspect of the invention 10a, wherein the shank 11 is fixedly mounted within a support hub 17. The support hub 17 includes plural pairs of diametrically opposed "L" shaped mounting legs 18 projecting radially and exteriorly of the hub 17 and each including a downwardly extending projection defined as a mounting leg tube 19 that are arranged in a parallel relationship relative to one another and concentrically and axially spaced relative to the axis 11a. Each of the mounting leg lower tubes 19 includes a telescopingly mounted extension leg 20, with each telescoping leg 20 including a release lock 23 directed through a respective tube 19 to permit locking of the extension legs 20 in an extended orientation relative to an associated tube 20. A resilient lawn mower deck engaging pad 21 is formed at each lower terminal end of each extension leg 20 to enhance frictional gripping and engaging of the top surface of the lawn mower deck, as illustrated in FIG. 8.

The shank 11 is fixedly engaged within and coaxially directed through a rotated central cylinder 24 rotatively mounted within the hub 17, wherein the central cylinder 24 includes an exterior surface form extending above the support hub 17 formed with spaced parallel ratchet teeth 24a that are engageable with an engagement pawl 25 pivotally mounted to the hub 17 adjacent the central cylinder 24. The engagement pawl 25 includes a pawl leaf spring 26 to bias the pawl 25 in engagement with the ratchet teeth 24a to thereby maintain the winding of the lawn mower pulley 14 during a winding procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower pull cord winding apparatus, comprising, an elongate, coaxially aligned shank defined along a predetermined axis, the shank including a shank upper distal end, wherein the shank upper distal end medially and orthogonally intersects a handle fixedly mounted to the upper distal end, and a lower end portion of the shank includes a plurality of lobes concentrically and integrally mounted to an exterior surface of the shank extending radially therefrom spaced apart an equal spacing relative to one another arranged in a coextensive parallel relationship relative to one another and the predetermined axis, and the shank is fixedly and coaxially mounted within a hub rotative central cylinder, and a support hub, the hub rotative central cylinder rotatably mounted within the support hub, the central cylinder including an exterior surface extending above a top surface of the support hub, and the exterior surface of the central cylinder including ratchet teeth arranged in a parallel relationship relative to one another and to the predetermined axis, and an engagement pawl pivotally mounted to the support hub adjacent the ratchet teeth and a spring member biasing the engagement pawl in engagement with the ratchet teeth to maintain a one-way rotation of the shank relative to the hub, and the support hub including plural pairs of radially aligned "L" shaped mounting legs extending exteriorly of the hub, wherein each of the mounting legs includes a mounting leg lower tube, each of the lower tubes arranged parallel relative to one another and to the predetermined axis for engagement with a top deck surface of an associated lawn mower.

2. An apparatus as set forth in claim 1 wherein each of the tubes includes a telescoping leg and a lock member to effect selective locking of each leg relative to each respective tube, and each extension leg including a lawn mower deck engaging pad formed at a lower distal end of each extension leg to enhance frictional engagement of each extension leg relative to the lawn mower deck.

* * * * *